(12) United States Patent
Liu et al.

(10) Patent No.: US 11,341,598 B2
(45) Date of Patent: May 24, 2022

(54) INTERPRETATION MAPS WITH GUARANTEED ROBUSTNESS

(71) Applicants: International Business Machines Corporation, Armonk, NY (US); Rensselaer Polytechnic Institute, Troy, NY (US)

(72) Inventors: Ao Liu, Troy, NY (US); Sijia Liu, Somerville, MA (US); Abhishek Bhandwaldar, Somerville, MA (US); Chuang Gan, Cambridge, MA (US); Lirong Xia, Troy, NY (US); Qi Cheng Li, Beijing (CN)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 230 days.

(21) Appl. No.: 16/894,343

(22) Filed: Jun. 5, 2020

(65) Prior Publication Data

US 2021/0383497 A1 Dec. 9, 2021

(51) Int. Cl.
*G06T 1/00* (2006.01)
*G06T 5/00* (2006.01)
(Continued)

(52) U.S. Cl.
CPC .............. *G06T 1/005* (2013.01); *G06N 3/02* (2013.01); *G06T 5/003* (2013.01); *G06T 5/20* (2013.01);
(Continued)

(58) Field of Classification Search
CPC .......... G06T 1/005; G06T 5/003; G06T 5/20; G06T 5/50; G06T 2207/20084; G06T 2207/20216; G06T 7/0012; G06N 3/02
See application file for complete search history.

(56) References Cited

U.S. PATENT DOCUMENTS

| 8,619,984 B2 | 12/2013 | McSherry et al. |
| 9,672,364 B2 | 6/2017 | Zhang et al. |

(Continued)

FOREIGN PATENT DOCUMENTS

| CN | 108805039 A | 11/2018 |
| CN | 109254274 A | 1/2019 |
| WO | WO2019211497 A3 | 1/2020 |

OTHER PUBLICATIONS

Pinot, R. et al., (2019). "A unified view on differential privacy and robustness to adversarial examples," arXiv preprint arXiv:1906.07982, Jun. 2019 (6 pages).

(Continued)

*Primary Examiner* — Phuoc Tran
(74) *Attorney, Agent, or Firm* — Anthony Curro; Michael J. Chang, LLC (57) ABSTRACT

Interpretation maps of deep neural networks are provided that use Renyi differential privacy to guarantee the robustness of the interpretation. In one aspect, a method for generating interpretation maps with guaranteed robustness includes: perturbing an original digital image by adding Gaussian noise to the original digital image to obtain m noisy images; providing the m noisy images as input to a deep neural network; interpreting output from the deep neural network to obtain m noisy interpretations corresponding to the m noisy images; thresholding the m noisy interpretations to obtain a top-k of the m noisy interpretations; and averaging the top-k of the m noisy interpretations to produce an interpretation map with certifiable robustness.

24 Claims, 5 Drawing Sheets

(51) Int. Cl.
 G06T 5/20 (2006.01)
 G06N 3/02 (2006.01)
 G06T 5/50 (2006.01)
(52) U.S. Cl.
 CPC ...... *G06T 5/50* (2013.01); *G06T 2207/20084* (2013.01); *G06T 2207/20216* (2013.01)

(56) References Cited

U.S. PATENT DOCUMENTS

| 10,229,282 | B2 | 3/2019 | Sierra et al. | |
|---|---|---|---|---|
| 10,496,369 | B2 | 12/2019 | Guttmann | |
| 10,937,156 | B2* | 3/2021 | Bilenko | G06T 7/0012 |
| 10,984,272 | B1* | 4/2021 | Shrivastava | G06N 3/08 |
| 2016/0203333 | A1 | 7/2016 | Fawaz et al. | |
| 2017/0109628 | A1 | 4/2017 | Gokmen et al. | |
| 2019/0012581 | A1 | 1/2019 | Honkala et al. | |
| 2019/0156057 | A1 | 5/2019 | Nissim Kobliner et al. | |
| 2020/0218932 | A1 | 7/2020 | Hensman et al. | |
| 2021/0157911 | A1* | 5/2021 | Yu | G06T 1/005 |

OTHER PUBLICATIONS

Bai Li et al., "Certified Adversarial Robustness with Additive Noise," 33rd Conference on Neural Information Processing Systems (NeurIPS 2019) Dec. 2019 (15 pages).

Simonyan et al., "Very Deep Convolutional Networks for Large-Scale Image Recognition," arXiv: 1409. 1556 Apr. 2015 (14 pages).

Dumitru M. Batinetu-Giurgiu et al., "A generalization of Radon's Inequality," Creative Math & Inf. 19 (2010), No. 2, 116-120.

Ruth Fong et al., "Understanding Deep Networks via Extremal Perturbations and Smooth Masks," Proceedings of the IEEE International Conference on Computer Vision Oct./Nov. 2019 (10 pages).

Simonyan et al., "Deep Inside Convolutional Networks: Visualising Image Classification Models and Saliency Maps," arXiv: 1312. 6034, Dec. 2013 (8 pages).

Yu-Xiang Wang et al., "On-Average KL-Privacy and its equivalence to Generalization for Max-Entropy Mechanisms," arXiv:1605. 02277, May 2016 (19 pages).

Jianming Zhang et al., "Top-down Neural Attention by Excitation Backprop," arXiv:1608.00507, Aug. 2016 (21 pages).

Pascal-Network.org, accessed Aug. 27, 2020 (4 pages).

Ghorbani et al., "Interpretation of Neural Networks Is Fragile," The Thirty-Third AAAI Conference on Artificial Intelligence (AAAI-19), pp. 3681-3688 (Jul. 2019).

Singh et al., "On the Benefits of Attributional Robustness," arXiv:1911. 13073 (Dec. 2019) (14 pages).

Levine et al., "Certifiably Robust Interpretation in Deep Learning," arXiv:1905.12105v3 (Oct. 2019) (24 pages).

Mironov, "Renyi Differential Privacy," 2017 IEEE 30th Computer Security Foundations Symposium, pp. 263-275 (Aug. 2017).

Montavon et al., "Methods for interpreting and understanding deep neural networks," Digital Signal Processing 73, pp. 1-15 (2018) (published Oct. 2017).

C. Dwork et al., "The algorithmic foundations of differential privacy," Foundations and Trends® in Theoretical Computer Science, vol. 9, No. 3-4, Aug. 2014, pp. 211-407.

J. Heo et al., "Fooling Neural Network Interpretations via Adversarial Model Manipulation," NeurIPS Feb. 2019 (12 pages).

* cited by examiner

INTERPRETATION MAPS WITH GUARANTEED ROBUSTNESS

FIELD OF THE INVENTION

The present invention relates to interpretation maps of deep neural networks, and more particularly, to interpretation maps of deep neural networks using Renyi divergence to guarantee the robustness of the interpretation.

BACKGROUND OF THE INVENTION

Deep neural network predictions are applied in a vast number of different decision-making scenarios ranging from economic to medical applications. For instance, in the field of medical diagnosis, a deep neural network-based machine learning process can be used to analyze images of an input deoxyribonucleic acid (DNA) sequence to determine if a patient has certain factors that place them at risk for a disease or other condition. Based on that information, physicians can perform related diagnostics and tests, devise appropriate treatment options, etc.

However, the interpretation maps of deep neural networks are very fragile against external perturbations. See, for example, Ghorbani et al., "Interpretation of Neural Networks Is Fragile," The Thirty-Third AAAI Conference on Artificial Intelligence (AAAI-19), pp. 3681-3688 (July 2019) (hereinafter "Ghorbani"). For instance, slight perturbations to the input image might be imperceptible to a viewer. However, these slight perturbations can cause the generation of vastly different interpretation maps by the deep neural network. These perturbations can be generated by measurement bias or by adversaries ("adversarial perturbations"). See Ghorbani.

It is important that the interpretations from the deep neural network are robust against these perturbations. For instance, using the above scenario regarding medical evaluation as an example, one does not want an imperceptible, slight perturbation of the input image to result in different interpretations that might even lead to conflicting results, diagnostics and/or treatments.

Thus, techniques for interpretation maps of deep neural networks which guarantees the robustness of the interpretation would be desirable.

SUMMARY OF THE INVENTION

The present invention provides interpretation maps of deep neural networks using Renyi differential privacy to guarantee the robustness of the interpretation. In one aspect of the invention, a method for generating interpretation maps with guaranteed robustness is provided. The method includes: perturbing an original digital image by adding Gaussian noise to the original digital image to obtain m noisy images; providing the m noisy images as input to a deep neural network; interpreting output from the deep neural network to obtain m noisy interpretations corresponding to the m noisy images; thresholding the m noisy interpretations to obtain a top-k of the m noisy interpretations; and averaging the top-k of the m noisy interpretations to produce an interpretation map with certifiable robustness.

A more complete understanding of the present invention, as well as further features and advantages of the present invention, will be obtained by reference to the following detailed description and drawings.

DETAILED DESCRIPTION OF PREFERRED EMBODIMENTS

As provided above, the interpretation maps of deep neural networks are very fragile against external perturbations generated by measurement bias, adversaries, etc. While these external perturbations might be imperceptible to the viewer, they can undesirably lead to vastly different interpretations.

Different approaches have been proposed to address these concerns. In one approach, interpretation robustness is achieved through adding regularization terms in the loss function of the training process. See, for example, Singh et al., "On the Benefits of Attributional Robustness," arXiv:1911.13073 (December 2019) (14 pages), the contents of which are incorporated by reference as if fully set forth herein. To do so, the training data is augmented with adversarial examples. However, with this approach there is a tradeoff between training accuracy and interpretation robustness. Further, this approach cannot cover all forms of adversarial perturbations. Thus, it does not provide any theoretical guarantee.

With another approach, a certifiable defense method for deep learning interpretation is achieved using a Smooth-Grad method to achieve robustness. A Smooth-Grad method takes the average gradient over random perturbations of the input. See Levine et al., "Certifiably Robust Interpretation in Deep Learning," arXiv:1905.12105v3 (October 2019) (24 pages) (hereinafter "Levine"), the contents of which are incorporated by reference as if fully set forth herein. While this approach provides a theoretical guarantee, it requires manually refactoring the interpretation map.

Advantageously, provided herein are techniques for generating interpretation maps (also referred to herein simply as "interpretations") of deep neural networks with theoretically guaranteed robustness. As will be described in detail below, the present techniques use Renyi differential privacy to guarantee the robustness of the interpretation. Renyi differential privacy corresponds to the notion of privacy described in Mironov, "Renyi Differential Privacy," 2017 IEEE 30th Computer Security Foundations Symposium, pp. 263-275 (August 2017) (hereinafter "Mironov"), the contents of which are incorporated by reference as if fully set forth herein. As described in Mironov, a process with Renyi differential privacy can guarantee that its output distribution is insensitive to small perturbations of the input. In the context of the present invention, the term 'privacy' generally refers to an amount of information that is known by adversaries. In other words, the more information adversaries have the less privacy there is, and vice versa. Thus, a 'minimum privacy level' (see below) refers to the maximum amount of information that can be known by adversaries.

Also provided herein are techniques to calculate the robustness bound against $l_2$-norm attributional attacks. In the context of the present invention, the term 'attack' refers to small perturbations added to the input image by an adversary. Thus, the terms 'attack' and 'perturbation' may be used interchangeably herein. For attributional perturbations, the interpretation of the perturbed image is very different from the interpretation of the original image. Adversaries may make attributional perturbations to cause misinterpretations.

As will be apparent from the description that follows, images are provided as input to a deep neural network for classification. For instance, if an input image provided to the deep neural network are that of a butterfly, then ideally the deep neural network outputs the classification (Butterfly). Interpretation maps are used to show how important the pixels of the input image are in the process of image classification. One important aspect of this image classification process is whether the predictions made by the deep neural network are trustworthy. For instance, as highlighted above, small imperceptible perturbations to the input images can result in vastly different interpretations and potential misclassification of the image, which calls into question the trustworthiness of the predictions. Advantageously, provided herein are techniques for generating interpretation maps of deep neural networks with theoretically guaranteed robustness, meaning that the interpretations are insensitive to external perturbations of the input image.

Figure 1:
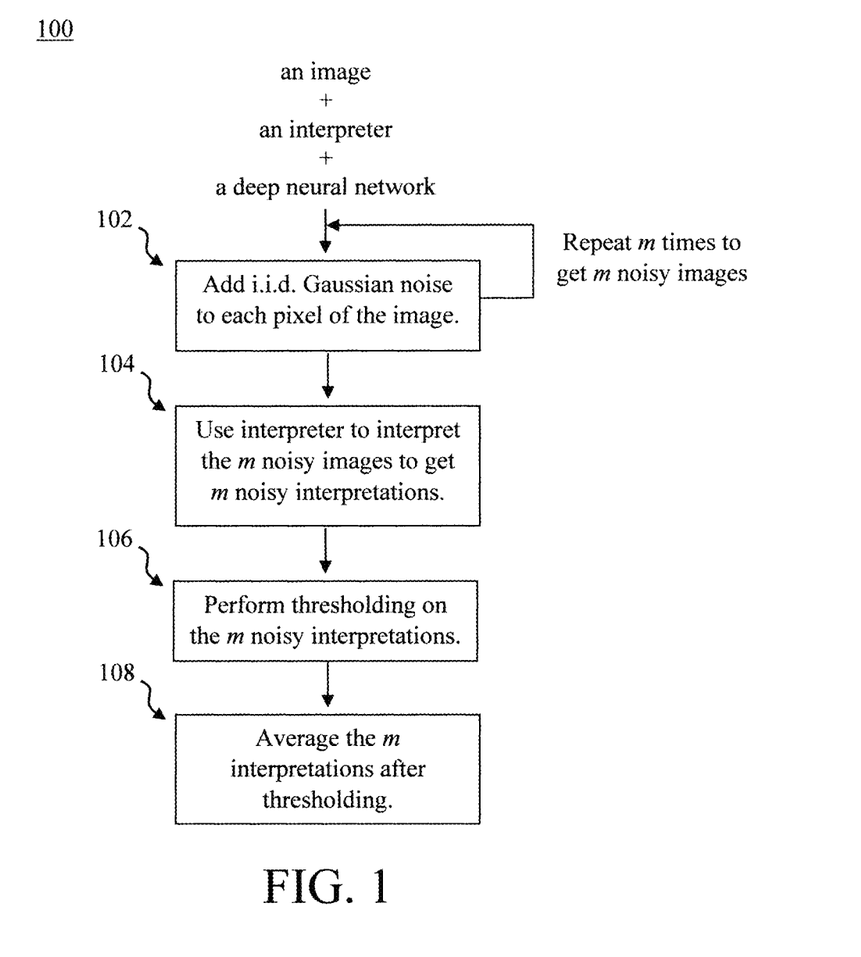
FIG. 1 is a diagram illustrating an exemplary methodology for generating interpretation maps with guaranteed robustness according to an embodiment of the present invention.

Given the above overview, FIG. 1 is a diagram illustrating an exemplary methodology 100 for generating interpretation maps with guaranteed robustness. As shown in FIG. 1, the input to the process is an image (also referred to herein as an 'input image'), an interpreter, and a deep neural network.

According to an exemplary embodiment, the input image is a digital image. As is generally known in the art, a digital image is composed of a collection of digital image elements or pixels. Each pixel has associated therewith a numeric representation of its intensity or gray level. As will be described in detail below, independently and identically distributed (i.i.d.) Gaussian noise will be added to each pixel in the input digital image to generate a plurality of noisy images from the input image.

According to an exemplary embodiment, the interpreter is a software tool that is used to provide how important are the input pixels in the output classification, e.g., via importance scores. For instance, the more important one pixel is, the larger its value will be in the interpretation maps.

In machine learning and cognitive science, deep neural networks are a family of statistical learning models inspired by the biological neural networks of animals, and in particular the brain. Deep neural networks may be used to estimate or approximate systems and cognitive functions that depend on a large number of inputs and weights of the connections which are generally unknown.

Figure 2:
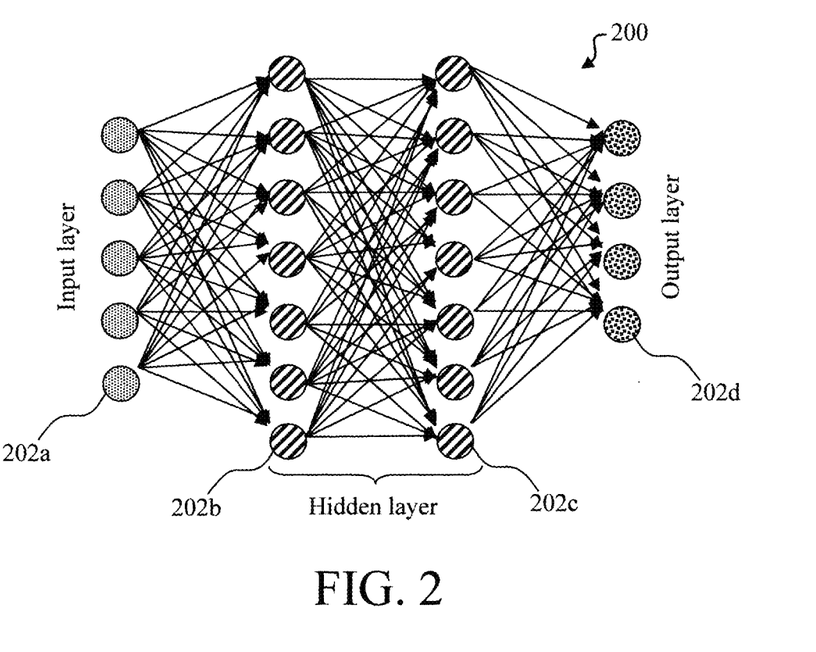
FIG. 2 is a schematic diagram illustrating an exemplary deep neural network according to an embodiment of the present invention.

Deep neural networks are often embodied as so-called "neuromorphic" systems of interconnected processor elements that act as simulated "neurons" that exchange "messages" between each other in the form of electronic signals. See, for example, FIG. 2 which provides a schematic illustration of an exemplary deep neural network 200. As shown in FIG. 2, deep neural network 200 includes a plurality of interconnected processor elements 202a, 202b/202c and 202d that form an input layer, at least one hidden layer, and an output layer, respectively, of the deep neural network 200.

Similar to the so-called "plasticity" of synaptic neurotransmitter connections that carry messages between biological neurons, the connections in a deep neural network that carry electronic messages between simulated neurons are provided with numeric weights that correspond to the strength or weakness of a given connection. The weights can be adjusted and tuned based on experience, making deep neural networks adaptive to inputs and capable of learning. For example, a deep neural network for image recognition is defined by a set of input neurons (see, e.g., input layer 202a in deep neural network 200) which may be activated by the pixels of an input image. After being weighted and transformed by a function determined by the network's designer, the activations of these input neurons are then passed to other downstream neurons, which are often referred to as "hidden" neurons (see, e.g., hidden layers 202b and 202c in deep neural network 200). This process is repeated until an output neuron is activated (see, e.g., output layer 202d in deep neural network 200). The activated output neuron determines what image was read.

Instead of utilizing the traditional digital model of manipulating zeros and ones, deep neural networks create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

By way of example only, a deep neural network can be embodied in an analog cross-point array of resistive devices. For an exemplary configuration of the resistive devices see, for example, the resistive processing units (RPUs) described in U.S. Patent Application Publication Number 2017/0109628 by Gokmen et al., entitled "Resistive Processing Unit," the contents of which are incorporated by reference as if fully set forth herein.

In step 102, independently and identically distributed (i.i.d.) Gaussian noise is added to each pixel of the image to obtain a noisy image. This added Gaussian noise constitutes perturbations of the input image. As is generally known in the art, i.i.d. Gaussian noise employs random variables that are uncorrelated and independent. In other words, the random variables are independent and identically distributed if each of the random variables has a same probability distribution as the other random variables, and all of the random variables are mutually independent.

Step 102 is independently repeated m times on the input image to get m noisy images. See FIG. 1. The m noisy images are then provided as input to the deep neural network which will analyze the image data. By independent it is meant that the noise added on the m noisy images are independent to each other. According to an exemplary embodiment, the value of m is from about 20 to about 200 and ranges therebetween. It is notable that the larger the value of m is, the less random the output interpretation will be, but also requires more computational resources.

In step 104, the interpreter is used to interpret the m noisy images. The result is m noisy interpretations. For instance, by way of example only, the interpreter converts the m noisy images into interpretation maps such as saliency maps. See, e.g., Ghorbani. A saliency map is an image that illustrates the unique quality of each pixel in the image. Saliency maps simplify, or in some other way change, the representation of an image into something that is simpler and easier to analyze. In other words, at this point in the process we now have m interpretations (i.e., images such as saliency maps) of the m images with noise (from step 102). As will be described in detail below, the pixels in these interpretations of the m images with noise will be used as components for a thresholding process to select the top-k interpretations.

As highlighted above, an interpretation map such as a saliency map is a mapping of abstract concepts such as predictions from a deep neural network into a form that a human user can understand and use. See, for example, Montavon et al., "Methods for interpreting and understanding deep neural networks," Digital Signal Processing 73, pp. 1-15 (2018) (published October 2017) (hereinafter "Montavon"), the contents of which are incorporated by reference as if fully set forth herein. For instance, as described in Montavon, human users can interpret data in the form of images or text that they can view/read to understand. On the other hand, data containing sequences of unknown words and/or symbols are abstract and cannot be interpreted by human users. Thus, an interpreter is needed to convert the data to a human-understandable form. For instance, again using the above scenario regarding medical evaluation, from a patient's DNA input a clinician or physician wishes to simply know whether that patient has certain factors that place them at risk for a disease or other condition. The physician cannot interpret output directly from the deep neural network. Thus, an interpreter is needed to place the data in a human user-understandable form. According to an exemplary embodiment, a commercial interpreter such as DeepLIFT (Deep Learning Important FeaTures) and/or Integrated Gradients is used. See, e.g., Ghorbani.

The next task is to identify the top-k pixels in the m noisy interpretations. Namely, as provided above, perturbations in the form of i.i.d. Gaussian noise were added to each pixel in the initial input image. Now we want to identify, following these perturbations, the top-k pixels in the perturbed (noisy) images. To do so, a thresholding process is performed in step 106 on the m noisy interpretations. According to an exemplary embodiment, step 106 involves setting the largest k components (pixels) in the m noisy interpretations to a value of one (1). All other remaining components (pixels) in the m noisy interpretations are set to a value of zero (0). The thresholding process produces images of the top-k of interpretation. In other words, at this point in the process we now have images of the m noisy interpretations with the intensity of the top-k pixels set to a value of one (1) and the intensity of all other pixels in the images set to a value of zero (0).

In step 108, an averaging of the m interpretations after the thresholding process is performed. Namely, in this step an averaging is performed of the m noisy interpretations with the intensity of the top-k pixels set to a value of one (1) and the intensity of all other pixels in the images set to a value of zero (0). By averaging it is meant that every pixel of the output interpretation is the arithmetic average of the corresponding pixels in the m noisy interpretations.

The result is an interpretation map with certifiable robustness. Namely, the interpretations generated in accordance with the present techniques are guaranteed against external perturbations. As highlighted above, small perturbations to an input image that might be imperceptible to a viewer of the image can undesirably lead to vastly different interpretations. For instance, taking the above example of a saliency map, the input image can be perturbed in some small way that is virtually undetectable when viewing the image, however the saliency maps both pre- and post-perturbation can be vastly different. See, e.g., Levine. With the present techniques, however, the interpretations are robust to external perturbations meaning that the external perturbations do not change the interpretations.

Figure 3:
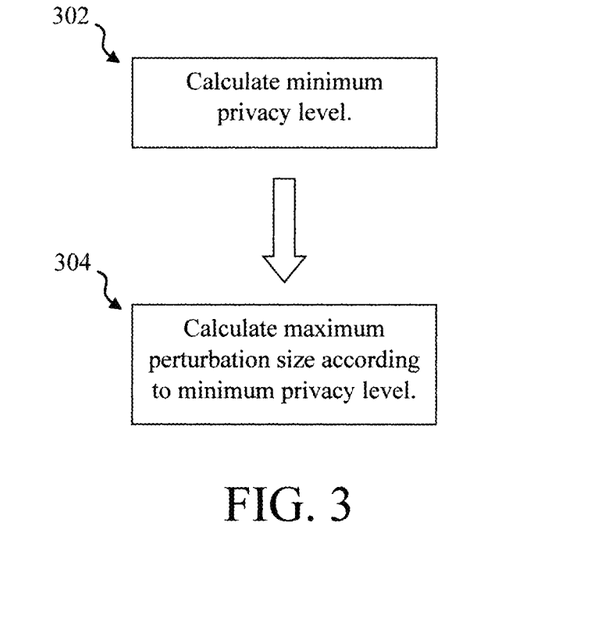
FIG. 3 is a diagram illustrating an exemplary methodology for calculating the robustness bound of the present interpretation map according to an embodiment of the present invention.

An exemplary embodiment for calculating the robustness bound of the present process is now described. The term 'bound' as used herein refers to the minimum guarantee. In the following description, the input image is denoted as x and the external perturbation is denoted as δ. The definition of robustness is as follows: for any external perturbation δ such that $\|\delta\|_2 < L$ we require at least β-ratio overlapping on the top k components of the interpretation map between the interpretation of x and x+δ. Because the privacy before step 108 of methodology 100 (see above) results in the robustness after step 108, the robustness bound can be calculated according to the approach shown illustrated in FIG. 3. Namely, FIG. 3 is a diagram illustrating an exemplary methodology 300 for calculating the robustness bound of the interpretation map with certifiable robustness.

In step 302, the minimum privacy level required by the robustness condition (where the robustness condition are the β and L conditions defined above) of the interpretation map is calculated as:

$$\epsilon_{max}(\alpha) = -\ln\left(2k_0\left(\frac{1}{2k_0}\sum_{i \in S}(m'_i)^{1-\alpha}\right)^{\frac{1}{1-\alpha}}\right) + \sum_{i \notin S} m'_i, \quad (1)$$

wherein $k_0 = (1-\beta)k$ and $m'_i$ is the normalized interpretation map of pixel-i.

In step 304, the maximum perturbation size (i.e., the maximum perturbation that can be added to the input image without violating the requirement on interpretation robustness) is calculated according to the minimum privacy level (calculated in Equation 1) above as:

$$L_{max} = \sup_{\alpha > 1} \sigma \cdot \sqrt{\frac{2\,\epsilon_{max}(\alpha)}{\alpha}} \quad (2)$$

wherein σ is the standard deviation of the Gaussian noise add to images. $L_{max}$ is the maximum $l_2$ norm for the external perturbation.

Figure 4:
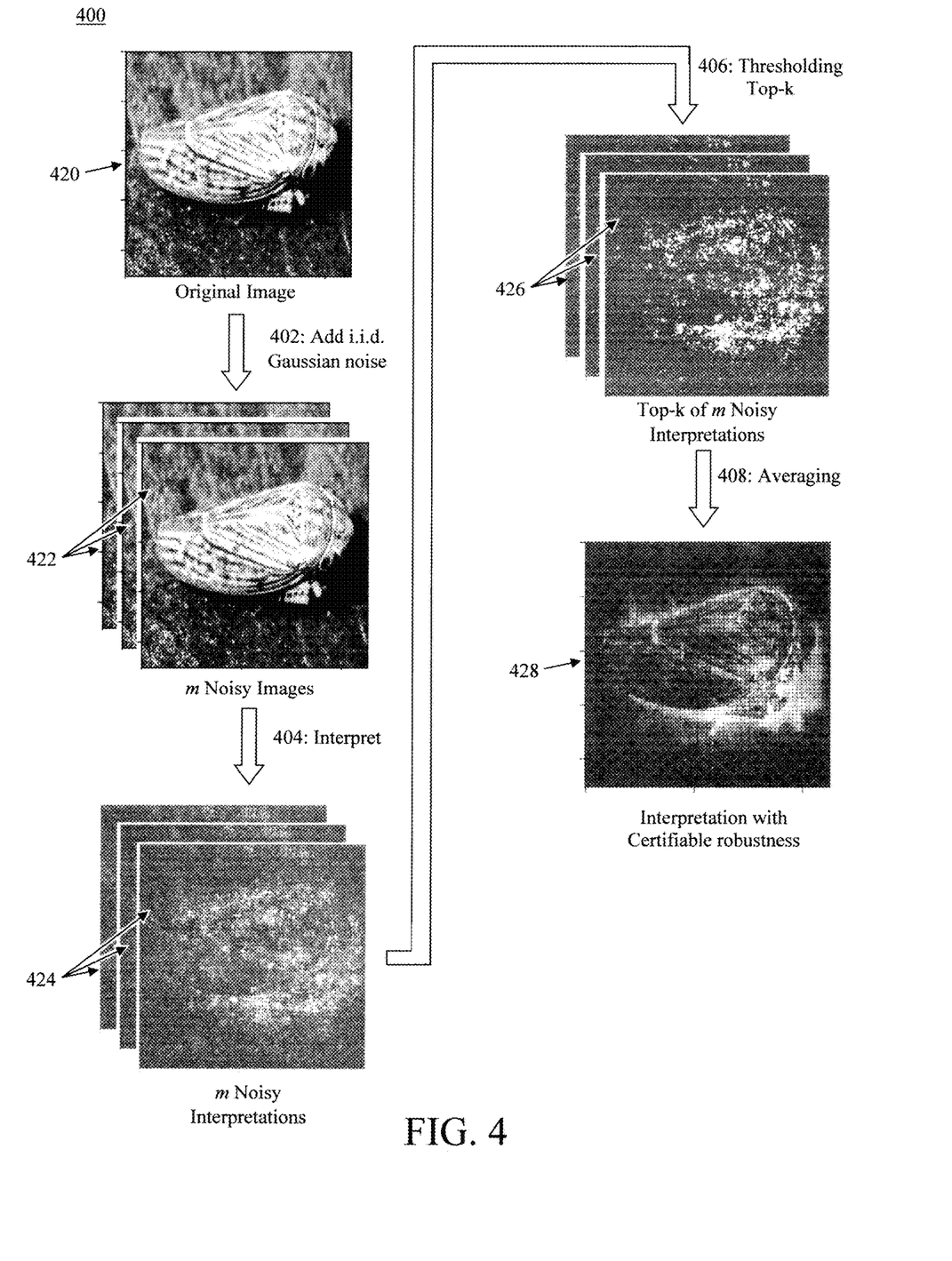
FIG. 4 is a diagram illustrating an exemplary methodology for generating interpretation maps with guaranteed robustness according to an embodiment of the present invention.

The present techniques are further described by way of reference to the following non-limiting example illustrated in FIG. 4. FIG. 4 is a diagram illustrating an exemplary methodology 400 for generating interpretation maps with guaranteed robustness. As shown in FIG. 4, an original (digital) image 420 is provided as an input to the process, and in step 402 original image 420 is perturbed by adding i.i.d. Gaussian noise to obtain m noisy images 422. In the same manner as described above, i.i.d. Gaussian noise is added to each pixel of the original image 420 to obtain an image with noise. This process is then independently repeated m times on the original image 420 to obtain the m noisy images 422.

Notably, when comparing the original image 420 to the m noisy images 422 it is apparent that the perturbations (added noise) are imperceptible to the human eye. In other words, in every practical sense the original image 420 and the m noisy images 422 appear the same. However, without some robustness guarantee, the original image 420 and the m noisy images 422 can lead to vastly different interpretations.

The m noisy images serve as input to a deep neural network which will analyze the image data. In step 404, the output from the deep neural network is interpreted by an interpreter such as DeepLIFT and/or Integrated Gradients. As shown in FIG. 4, the interpreter produces m noisy interpretations 424 corresponding to the m noisy images 422. As will be described in detail below, a thresholding process will later be used to select the top-k interpretations from these m noisy interpretations 424.

By way of example only, according to an exemplary embodiment the m noisy interpretations 424 are in the form of saliency maps. As described above, a saliency map is an image that illustrates the unique quality of each pixel in the image. Saliency maps simplify, or in some other way change, the representation of an image into something that is simpler and easier to analyze.

As highlighted above, a thresholding process is used to identify the top-k pixels in the m noisy interpretations 424. According to an exemplary embodiment, the thresholding process involves setting the largest k components (pixels) in the m noisy interpretations to a value of one (1) and all other remaining components (pixels) in the m noisy interpretations to a value of zero (0). As shown in step 406 of FIG. 4, the results of the thresholding process are top-k of the m noisy interpretations 426. In other words, the top-k of the m noisy interpretations 426 are images of the m noisy interpretations (corresponding to the m noisy images 422) with the intensity of the top-k pixels set to a value of one (1) and the intensity of all other pixels in the images set to a value of zero (0).

In step 408, averaging of the top-k of the m noisy interpretations 426 is performed. As provided above, by 'averaging' it is meant that every pixel of the output interpretation is the arithmetic average of the corresponding pixels in the m noisy interpretations. As shown in FIG. 4, the result is an interpretation map with certifiable robustness 428 against external perturbations whether generated by measurement bias, by adversaries ("adversarial perturbations"), etc.

Figure 5:
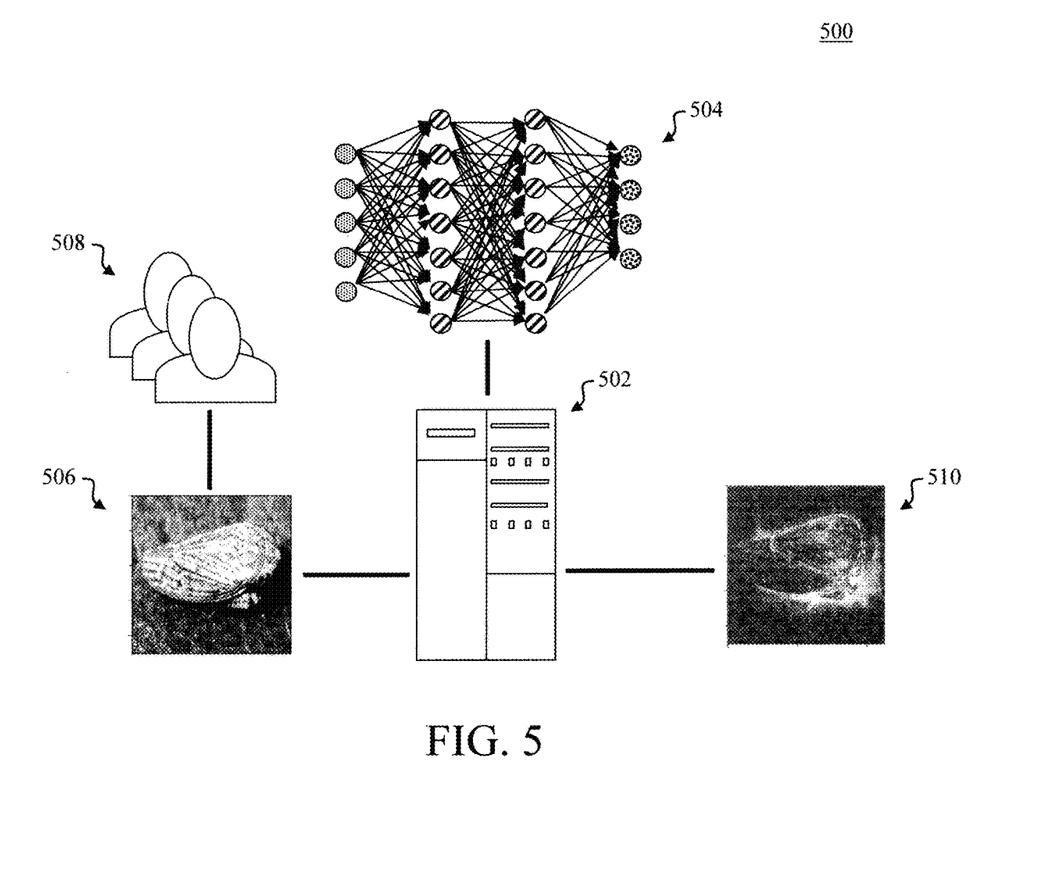
FIG. 5 is a diagram illustrating an exemplary system for generating interpretation maps with guaranteed robustness according to an embodiment of the present invention.

FIG. 5 is a diagram illustrating an exemplary system 500 for generating interpretation maps with guaranteed robustness. As shown in FIG. 5, system 500 includes a computer-based apparatus 502 (such as a server) and a deep neural network 504. An exemplary apparatus that may be configured to serve as apparatus 502 is described in conjunction with the description of FIG. 6, below. Optionally, deep neural network 504 may be run on computer-based apparatus 502 or on another computing infrastructure.

As provided above, an original image is provided as input to the present process. By way of example only, this input image 506 can be provided by a user or users 508 to apparatus 502. Apparatus 502 is then configured to carry out one or more of the steps of methodology 100 of FIG. 1 (see above) to generate an interpretation with certifiable robustness 510.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
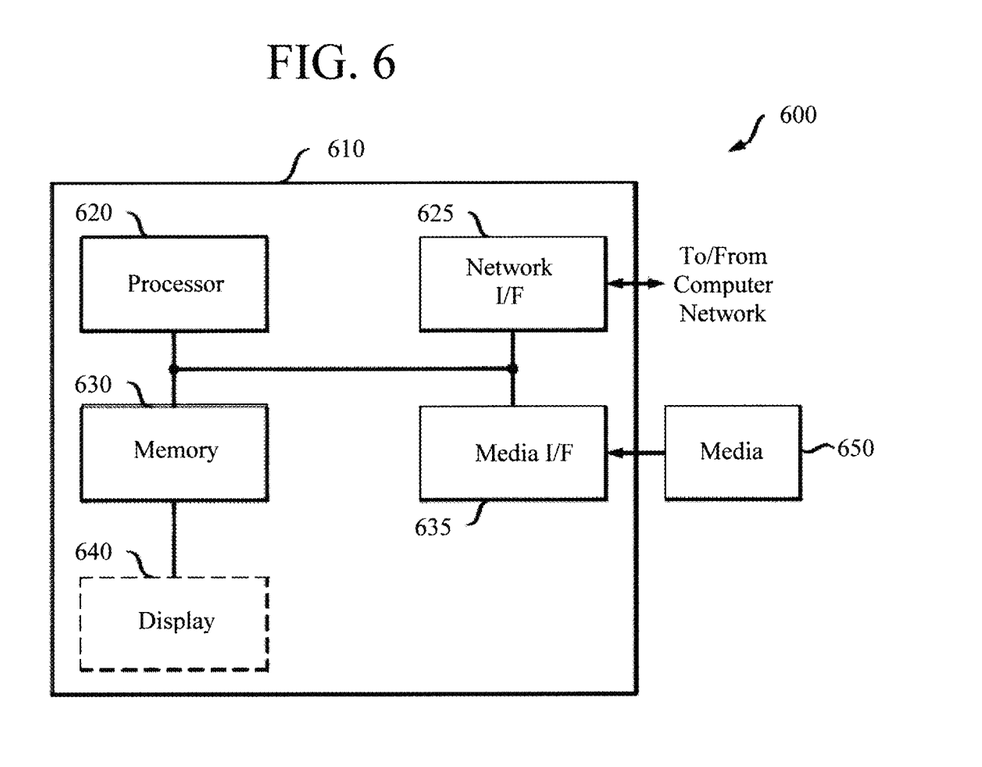
FIG. 6 is a diagram illustrating an exemplary apparatus for performing one or more of the methodologies presented herein according to an embodiment of the present invention.

Turning now to FIG. 6, a block diagram is shown of an apparatus 600 for implementing one or more of the methodologies presented herein. By way of example only, apparatus 600 can be configured to implement one or more of the steps of methodology 100 of FIG. 1 and/or one or more steps of methodology 300 of FIG. 3. For instance, according to an exemplary embodiment, apparatus 502 in system 500 of FIG. 5 may be embodied in apparatus 600.

Apparatus 600 includes a computer system 610 and removable media 650. Computer system 610 includes a processor device 620, a network interface 625, a memory 630, a media interface 635 and an optional display 640. Network interface 625 allows computer system 610 to connect to a network, while media interface 635 allows computer system 610 to interact with media, such as a hard drive or removable media 650.

Processor device 620 can be configured to implement the methods, steps, and functions disclosed herein. The memory 630 could be distributed or local and the processor device 620 could be distributed or singular. The memory 630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 620. With this definition, information on a network, accessible through network interface 625, is still within memory 630 because the processor device 620 can retrieve the information from the network. It should be noted that each distributed processor that makes up processor device 620 generally contains its own addressable memory space. It should also be noted that some or all of computer system 610 can be incorporated into an application-specific or general-use integrated circuit.

Optional display 640 is any type of display suitable for interacting with a human user of apparatus 600. Generally, display 640 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for generating interpretation maps with guaranteed robustness, the method comprising the steps of:
    perturbing an original digital image by adding Gaussian noise to the original digital image to obtain m noisy images;
    providing the m noisy images as input to a deep neural network;
    interpreting output from the deep neural network to obtain m noisy interpretations corresponding to the m noisy images;
    thresholding the m noisy interpretations to obtain a top-k of the m noisy interpretations; and
    averaging the top-k of the m noisy interpretations to produce an interpretation map with certifiable robustness.

2. The method of claim 1, further comprising the steps of:
    adding the Gaussian noise to each pixel of the original digital image; and
    repeating the adding step independently m times on the original digital image to obtain m noisy images.

3. The method of claim 1, wherein the m noisy interpretations comprise saliency maps.

4. The method of claim 1, further comprising the steps of:
    setting largest k components in the m noisy interpretations to a value of one (1); and setting all other remaining components in the m noisy interpretations to a value of zero (0).

5. The method of claim 4, wherein the components comprise pixels in the m noisy interpretations.

6. The method of claim 1, further comprising the step of: calculating a robustness bound of the interpretation map with certifiable robustness.

7. The method of claim 6, further comprising the steps of: calculating a minimum privacy level required by a robustness condition of the interpretation map with certifiable robustness; and
calculating a maximum perturbation size without violating a requirement of interpretation robustness.

8. The method of claim 7, wherein the minimum privacy level is calculated as:

$$\epsilon_{max}(\alpha) = -\ln\left(2k_0\left(\frac{1}{2k_0}\sum_{i \in S}(m'_i)^{1-\alpha}\right)^{\frac{1}{1-\alpha}}\right) + \sum_{i \notin S} m'_i,$$

wherein $k_0=(1-\beta)k$ and $m'_i$ is a normalized interpretation map of pixel-i.

9. The method of claim 7, wherein the maximum perturbation size is calculated as:

$$L_{max} = \sup_{\alpha>1} \sigma \cdot \sqrt{\frac{2\epsilon_{max}(\alpha)}{\alpha}},$$

wherein $\sigma$ is a noise level add to images, and $L_{max}$ is a maximum $l_2$ norm for external perturbation.

10. A method for generating interpretation maps with guaranteed robustness, the method comprising the steps of:
perturbing an original digital image by adding Gaussian noise to each pixel of the original digital image, and repeating the adding step independently m times on the original digital image to obtain m noisy images;
providing the m noisy images as input to a deep neural network;
interpreting output from the deep neural network to obtain m noisy interpretations corresponding to the m noisy images;
thresholding the m noisy interpretations by setting largest k components in the m noisy interpretations to a value of one (1) and setting all other remaining components in the m noisy interpretations to a value of zero (0) to obtain a top-k of the m noisy interpretations;
averaging the top-k of the m noisy interpretations to produce an interpretation map with certifiable robustness; and
calculating a robustness bound of the interpretation map with certifiable robustness.

11. A system for generating interpretation maps with guaranteed robustness, the system comprising:
a deep neural network;
an interpreter software tool; and
an apparatus comprising a processor, connected to a memory, operable to:
perturb an original digital image by adding Gaussian noise to the original digital image to obtain m noisy images;
provide the m noisy images as input to the deep neural network;
interpret output from the deep neural network using the interpreter to obtain m noisy interpretations corresponding to the m noisy images;
threshold the m noisy interpretations to obtain a top-k of the m noisy interpretations; and
average the top-k of the m noisy interpretations to produce an interpretation map with certifiable robustness.

12. The system of claim 11, wherein the processor is further operable to:
add the Gaussian noise to each pixel of the original digital image; and
repeat the adding step independently m times on the original digital image to obtain m noisy images.

13. The system of claim 11, wherein the processor is further operable to:
set largest k components in the m noisy interpretations to a value of one (1); and
set all other remaining components in the m noisy interpretations to a value of zero (0), wherein the components comprise pixels in the m noisy interpretations.

14. The system of claim 11, wherein the processor is further operable to:
calculate a robustness bound of the interpretation map with certifiable robustness.

15. The system of claim 14, wherein the processor is further operable to:
calculate a minimum privacy level required by a robustness condition of the interpretation map with certifiable robustness; and
calculate a maximum perturbation size without violating a requirement of interpretation robustness.

16. The system of claim 15, wherein the minimum privacy level is calculated as:

$$\epsilon_{max}(\alpha) = -\ln\left(2k_0\left(\frac{1}{2k_0}\sum_{i \in S}(m'_i)^{1-\alpha}\right)^{\frac{1}{1-\alpha}}\right) + \sum_{i \notin S} m'_i,$$

wherein $k_0=(1-\beta)k$ and $m'_i$ is a normalized interpretation map of pixel-i.

17. The system of claim 15, wherein the maximum perturbation size is calculated as:

$$L_{max} = \sup_{\alpha>1} \sigma \cdot \sqrt{\frac{2\epsilon_{max}(\alpha)}{\alpha}},$$

wherein $\sigma$ is a noise level add to images, and $L_{max}$ is a maximum $l_2$ norm for external perturbation.

18. A non-transitory computer program product for generating interpretation maps with guaranteed robustness, the computer program product comprising a computer readable storage medium having program instructions embodied therewith, the program instructions executable by a computer to cause the computer to:
perturb an original digital image by adding Gaussian noise to the original digital image to obtain m noisy images;
provide the m noisy images as input to the deep neural network;
interpret output from the deep neural network using the interpreter to obtain m noisy interpretations corresponding to the m noisy images;

threshold the m noisy interpretations to obtain a top-k of the m noisy interpretations; and average the top-k of the m noisy interpretations to produce an interpretation map with certifiable robustness.

19. The non-transitory computer program product of claim 18, wherein the program instructions further cause the computer to:

add the Gaussian noise to each pixel of the original digital image; and repeat the adding step independently m times on the original digital image to obtain m noisy images.

20. The non-transitory computer program product of claim 18, wherein the program instructions further cause the computer to:

set largest k components in the m noisy interpretations to a value of one (1); and set all other remaining components in the m noisy interpretations to a value of zero (0), wherein the components comprise pixels in the m noisy interpretations.

21. The non-transitory computer program product of claim 18, wherein the program instructions further cause the computer to:

calculate a robustness bound of the interpretation map with certifiable robustness.

22. The non-transitory computer program product of claim 21, wherein the program instructions further cause the computer to:

calculate a minimum privacy level required by a robustness condition of the interpretation map with certifiable robustness; and calculate a maximum perturbation size without violating a requirement of interpretation robustness.

23. The non-transitory computer program product of claim 22, wherein the minimum privacy level is calculated as:

$$\epsilon_{max}(\alpha) = -\ln\left(2k_0\left(\frac{1}{2k_0}\sum_{i \in S}(m'_i)^{1-\alpha}\right)^{\frac{1}{1-\alpha}}\right) + \sum_{i \notin S} m'_i,$$

wherein $k_0 = (1-\beta)k$ and $m'_i$ is a normalized interpretation map of pixel-i.

24. The non-transitory computer program product of claim 22, wherein the maximum perturbation size is calculated as:

$$L_{max} = \sup_{\alpha > 1} \sigma \cdot \sqrt{\frac{2 \epsilon_{max}(\alpha)}{\alpha}},$$

wherein $\sigma$ is a noise level add to images, and $L_{max}$ is a maximum $l_2$ norm for external perturbation.

* * * * *